(12) United States Patent
Kim

(10) Patent No.: US 11,470,705 B2
(45) Date of Patent: Oct. 11, 2022

(54) VEHICLE SMART LIGHTING SYSTEM AND CONTROL METHOD THEREFOR

(71) Applicant: CHORDERS, Ansan-si (KR)

(72) Inventor: Ju Wan Kim, Bucheon-si (KR)

(73) Assignee: CHORDERS, Ansan-si (KR)

( * ) Notice: Subject to any disclaimer, the term of this patent is extended or adjusted under 35 U.S.C. 154(b) by 0 days.

(21) Appl. No.: 17/420,677

(22) PCT Filed: Mar. 6, 2019

(86) PCT No.: PCT/KR2019/002555
§ 371 (c)(1),
(2) Date: Jul. 4, 2021

(87) PCT Pub. No.: WO2020/158994
PCT Pub. Date: Aug. 6, 2020

(65) Prior Publication Data
US 2022/0104328 A1    Mar. 31, 2022

(30) Foreign Application Priority Data

Jan. 30, 2019 (KR) .................. 10-2019-0012219

(51) Int. Cl.
*B60Q 3/80* (2017.01)
*H05B 47/105* (2020.01)
*H05B 45/10* (2020.01)
*H05B 45/20* (2020.01)

(52) U.S. Cl.
CPC .......... *H05B 47/105* (2020.01); *B60Q 3/80* (2017.02); *H05B 45/10* (2020.01); *H05B 45/20* (2020.01); *B60Q 2500/00* (2013.01); *B60Q 2900/30* (2013.01)

(58) Field of Classification Search
None
See application file for complete search history.

(56) References Cited

U.S. PATENT DOCUMENTS

2020/0207264 A1*  7/2020  Camras ............... H05B 45/24

FOREIGN PATENT DOCUMENTS

| JP | 2013-169960 A | | 9/2013 |
|---|---|---|---|
| JP | 2015058739 A | * | 3/2015 |
| KR | 10-2010-0104877 A | | 9/2010 |
| KR | 10-2012-0115643 A | | 10/2012 |
| KR | 10-2012-0126335 A | | 11/2012 |
| KR | 10-1625872 B1 | | 6/2016 |
| KR | 10-1748594 B1 | | 6/2017 |
| KR | 10-1776487 B1 | | 9/2017 |

OTHER PUBLICATIONS

International Search Report for PCT/KR2019/002555 dated Oct. 25, 2019 from Korean Intellectual Property Office.

\* cited by examiner

*Primary Examiner* — Dedei K Hammond
(74) *Attorney, Agent, or Firm* — Revolution IP, PLLC

(57) ABSTRACT

A vehicle smart lighting system includes: a lighting device which is installed inside a vehicle and emits light for indoor lighting; a control device for outputting a control signal for controlling the lighting device on the basis of vehicle environment information according to the internal and external environments of the vehicle; and a user terminal for executing an application to customize a lighting pattern of the lighting device.

4 Claims, 12 Drawing Sheets

(a) Color Control Being
Possible in Entire LEDs (b) Color Control Being
Possible in Individual LED

VEHICLE SMART LIGHTING SYSTEM AND CONTROL METHOD THEREFOR

The present invention relates to a smart lighting system for a vehicle and a method thereof. More specifically, the present invention relates to a smart lighting system for a vehicle and a method thereof, wherein a lighting device installed in the vehicle operates in many patterns in response to inner and outer atmospheres of the vehicle and wherein a user customizes illumination patterns at his/her discretion according to such atmospheres at the same time.

In general, the vehicle is equipped with indoor light for illuminating the vehicle inside so that a passenger may work even in a dark circumstance, such as a tunnel or an underground parking space after sunset.

Although such indoor lights can create diverse environments depending on illumination manners, and thus, they affect the driver's or passenger's psychology, the illumination lights installed in a conventional vehicle merely function as the illumination light for illuminating a vehicle inside or as a mood light. It is not only because the illumination light is fixed to a position designed at the time of car manufacturing, but also because a predetermined monochromic light is emitted only by a single LED device or simple change of color is possible in an entire LED device.

Therefore, it is desired to provide a smart lighting system, which can provide a driver with diverse information in an intuitive manner, which creates various atmospheres within the vehicle in accordance with inner and outer circumstances of the vehicle, and which comprises a mood light-function capable of expressing a user's personality on vehicle interior according to a user's preference.

CITED DOCUMENT (Cited Document 1) KR 10-1748594 (Jun. 13, 2017)

DETAILED DESCRIPTION OF THE INVENTION

Object of the Invention

The present invention is to solve the above-stated technical problems. An object of the present invention is to provide a driver with information in an intuitive manner by means of a lighting device and a system for controlling the lighting device, wherein the information is related to surrounding environment and driving and wherein the lighting device operates in various patterns in accordance with inner and outer circumstances of a vehicle.

The other object of the present invention is to provide a smart lighting system for a vehicle, wherein the user may customize illumination patterns of the lighting device at his/her discretion, so that diverse environments within a vehicle are created to provide diversity of the vehicle interior.

The technical objects of the present invention are not restricted to the above-stated ones and further objects that are not mentioned could be understood by one of ordinary skill in the art from the description below.

In order to solve the above-described technical problems, a smart lighting system for a vehicle according to an embodiment of the present invention comprises an lighting device for emitting light, which is installed in a vehicle for the purpose of illumination, and a control device for outputting a control signal for controlling the lighting device based on vehicle environment information according to inner and outer atmospheres of the vehicle, wherein the control signal may include illumination pattern information of the lighting device according to the vehicle environment information.

According to an embodiment, the smart lighting system for the vehicle may further include a user terminal configured to customize the illumination pattern of the lighting device by executing an application and to control the control device or the lighting device.

According to an embodiment, the lighting device may include a signal receiver unit for receiving a control signal from the control device, and one or more LEDs (Light Emitting Diodes) for emitting light according to the control signal.

According to an embodiment, the lighting device may include a plurality of LEDs capable of individual color control.

According to an embodiment, the lighting device may include one or more LEDs capable of stepwise brightness control.

According to an embodiment, the illumination pattern may include information with respect to On/Off status, color or brightness of the one or more LEDs.

According to an embodiment, the illumination pattern information may be set to match with the vehicle environment information.

According to an embodiment, the vehicle environment information may include any one of instrument panel information of the vehicle, vehicle posture, vehicle speed, weather, amount of fine dust, vehicle location, navigation information, speeding information, traffic safety information, and audio information.

According to an embodiment, the control device may include a communication unit for communicating with a sensor provided in the user terminal, the vehicle, or the control device so as to receive data about the inner and outer atmospheres of the vehicle; an analysis unit for analyzing said-received data so as to produce the vehicle environment information; a memory unit for storing illumination pattern customized by the user terminal; and a control unit for generating control signals so as to control the lighting device according to the analysis result of the analysis unit.

According to an embodiment, the user terminal may include: a processor for executing an application enabling customization of the illumination pattern; a communication module for communicating with the control unit so as to transmit and receive data; an input module for receiving the user interaction; and a display module for displaying said-executed application.

In order to achieve the above-described technical object, a method of controlling a smart lighting system for a vehicle may comprises steps of: a control device outputting a control signal for controlling a lighting device based on vehicle environment information according to inner and outer atmospheres of the vehicle; and the lighting device emitting light according to the control signal, wherein the control signal may comprise illumination pattern information of the lighting device according to the vehicle environment information.

According to an embodiment, the method of controlling the smart lighting system for the vehicle may comprises, before the step of outputting the control signal, a step of customizing the illumination pattern of the lighting device by means of an application executed by the user terminal.

According to an embodiment, the step of customizing the illumination pattern may include customization of the illumination pattern by matching with the vehicle environment information.

According to an embodiment, the vehicle environment information may include any one of instrument panel information of the vehicle, vehicle posture, vehicle speed, weather, fine dust amount, vehicle location, navigation information, speeding information, traffic safety information, and audio information.

According to an embodiment, the step of outputting the control signal may include: receiving data about the inner and outer atmospheres of the vehicle by communicating with a sensor provided in the user terminal, the vehicle or the control device; producing the vehicle environment information by analyzing the received data; and generating and outputting the control signal for controlling the lighting device according to the analysis result.

Advantages of the Invention

According to the present invention, with the use of the lighting device operating in diverse patterns in response to diverse inner and outer environments of the vehicle and the system for controlling the same, it is possible to provide a driver in an intuitive manner with driving-related information.

In addition, the present invention allows the user to customize the light emission pattern of the lighting device at his/her discretion, so that the smart lighting system for the vehicle enabling creation of diverse environments in the vehicle may be provided.

Advantageous effects of the present invention are not limited to the above-mentioned effects, and other effects not mentioned will be clearly understood by those skilled in the art from the description below.

[Reference Numeral]

Figure 1:
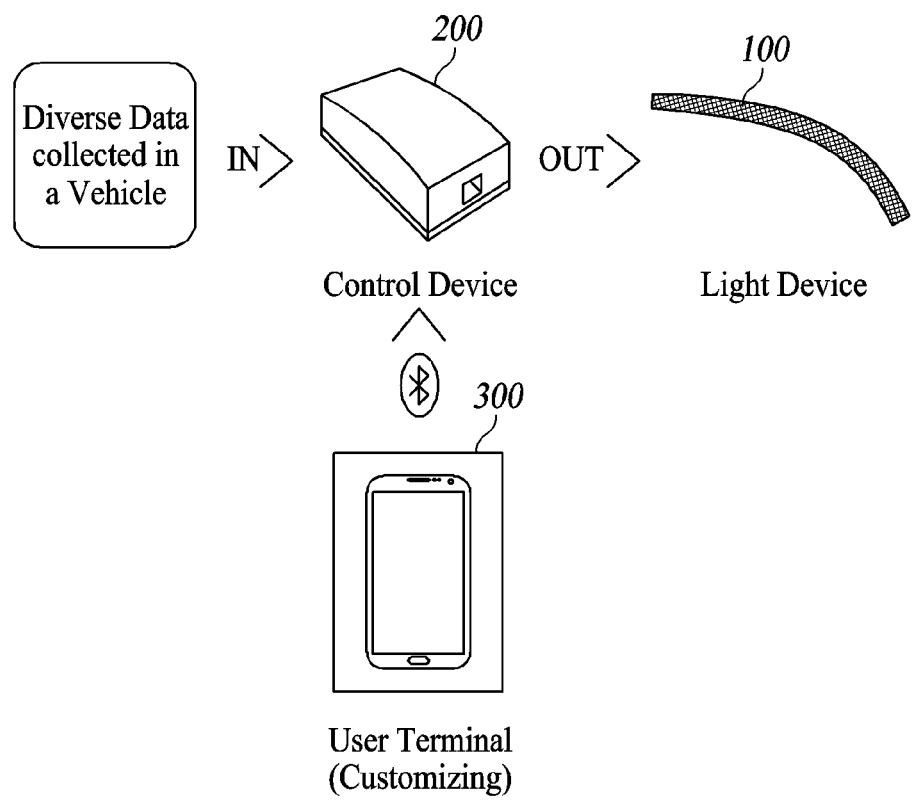
FIG. 1 shows a configuration of a smart lighting system for a vehicle according to an embodiment of the present invention.

10: Smart lighting system for vehicle
100: lighting device
210: communication unit
200: control device
220: analysis unit
230: memory unit
300: user terminal
320: communication module
340: display module
240: control unit
310: processor
330: input module Hereinafter, a preferred embodiment of the present invention will be detailed with reference to the drawings. The advantages and the characteristic features of the present invention, and the way of attaining the same will be apparent from the description of the embodiments and the attached drawings. The present invention is not limited to the embodiments described below, but it may be attained in diverse forms. The embodiments are provided for so as to make the disclosure of the claimed invention complete and to let one of ordinary skill in the art understand the scope of the present invention. The present invention is defined only by the claims. The same reference numerals in the description indicate the same elements.

Unless otherwise defined, every term described in the specification (including technical and scientific term) is used for expressing the meaning that can be commonly understood by one of ordinary skill in the art. Also, the terms defined in a general dictionary should not be interpreted in an ideal or excessive manner, unless they are apparently and specifically defined. The terms in the description are used for describing the embodiments of the present invention, but not for restricting the present invention. In the description, a singular form covers a plural form, unless defined otherwise.

In the drawings, any part that is not concerned with the description is omitted in order to clearly describe the present invention. The same or similar element is denoted with the same reference numeral throughout the specification. Further, when a certain part "comprises" a certain element, it means that additional inclusion of other element is possible, but not exclusion of the latter, unless defined otherwise. Also, "a part" in the description means a unit or a block performing a specific function.

FIG. 1 illustrates a configuration of a smart lighting system 10 of a vehicle in accordance with an embodiment of the present invention.

Referring to FIG. 1, a smart lighting system 10 of a vehicle in accordance with an embodiment of the present invention comprises a lighting device 100, control device 200 and a user terminal 300.

Figure 2:
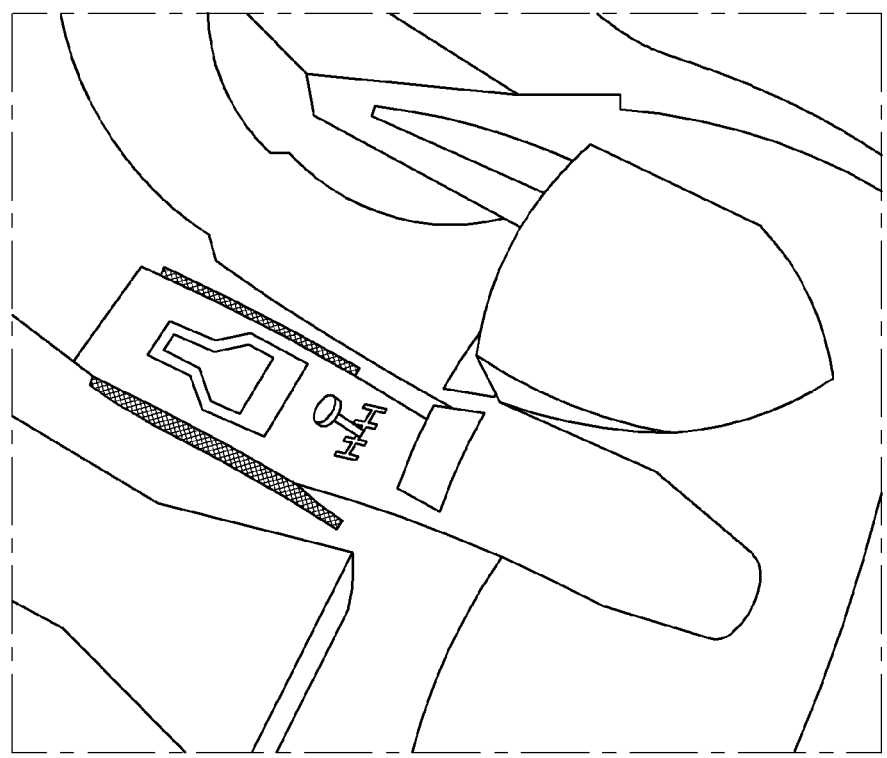
FIG. 2 shows an example of a lighting device installed in a vehicle according to an embodiment of the present invention.

The lighting device 100 is installed within a vehicle inside or an inner space of the vehicle, so that it may emit light for illuminating the vehicle inside. FIG. 2 illustrates the lighting device installed within the vehicle inside in accordance with an embodiment of the present invention. Here, the lighting device 100 may be diversely controlled based on control signals from the control device 200 so as to emit light in accordance with vehicle environment information with regard to the inner and outer atmospheres of the vehicle. In this connection, further description will be given below, while describing the function of the control device 200 and the user terminal 300.

In accordance with an embodiment, the lighting device 100 comprises a plurality of LEDs (light-emitting diodes), wherein color control of the LEDs may be individually controlled.

FIG. 3a shows a lighting device in a prior art, while FIG. 3b shows a lighting device in accordance with an embodiment of the present invention, which is capable of individual color control.

Figure 3:
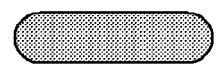
FIG. 3 shows an example of a lighting device capable of individual color control according to an embodiment of the present invention.
Figure 3:

Referring to FIG. 3, in the case of a lighting device used in a conventional vehicle, a single LED device emits a monochromic light with predetermined color as shown in FIG. 3a. Accordingly, only a function of illuminating vehicle interior is made. On the contrary, the lighting device 100 of the present invention comprises a plurality of LEDs, wherein individual color control of the LED is made as shown in FIG. 3b. Accordingly, it is possible to create the vehicle interior moods by means of diverse colors and to provide a user with information regarding the inner and outer atmospheres of the vehicle in a more intuitive manner. Preferably, the lighting device 100 of the present invention has a flexible or fixable feature so as to fix it to any location in the vehicle. Also, the lighting device 100 comprises an LED strip, each LED belonging to the LED strip being individually controlled. The lighting device 100 further comprises a case (not shown) receiving a plurality of said LEDs, which makes it possible to achieve a surface emission of light.

According to an embodiment, it is possible to control brightness of the LEDs in the lighting device 100 in a stepwise manner. In other words, the brightness of the lighting device 100 may be controlled according to a plurality of steps, wherein the brightness of each LED is individually controlled, similar to the color control as described above.

Also, the smart lighting system 10 for the vehicle in accordance with an embodiment may comprise a plurality of lighting devices 100. In such a case as the smart lighting system 10 having the plurality of the lighting devices 100, each lighting device 100 may be individually controlled in its color and brightness, either.

The lighting device 100 may comprise a signal receiver unit for receiving control signal from the control device 200. Here, the control signal means the signal comprising information related to illumination patterns, which comprise On/Off control or color and brightness control information of the LED configuring the lighting device 100. The control signal is generated and outputted by the control device 200. In this connection, more detailed description will be given below.

The lighting device 100 receives music signals through an AUX terminal or a sound sensor installed in the vehicle. Also, it is wire-connected to the vehicle by means of a cigar jack or USB connection terminal for connection to an external power source. Otherwise, the lighting device has a separate power source (such as a battery) so as to have a power supply.

The control device 200 may output control signals for controlling the lighting device based on vehicle environment information in accordance with the inner and outer atmospheres of the vehicle.

Figure 4:
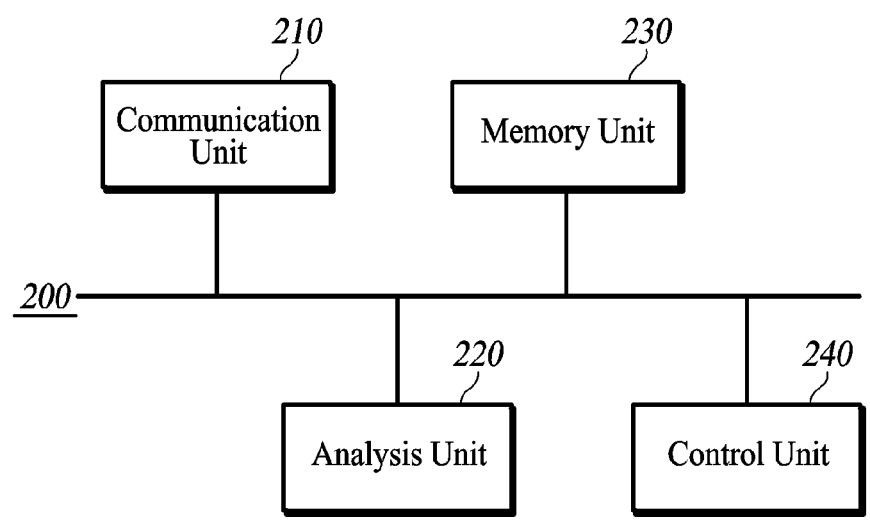
FIG. 4 shows a configuration of a control device according to an embodiment of the present invention.

FIG. 4 shows the configuration of the control device in accordance with an embodiment of the present invention.

Referring to FIG. 4, the control device 200 according to an embodiment of the present invention comprises a communication unit 210, an analysis unit 230 and a control unit 240.

The communication unit 210 performs communication with peripheral devices of the control device 200 using a wire- and/or wireless-communication network so as to transmit and receive data. Particularly, the communication unit 210 receives data related to the inner and outer atmospheres of the vehicle from the user terminal 300 or many kinds of sensors installed in the vehicle, such as an accelerator sensor, a gyro sensor, a speed sensor, a GPS module and so forth. Also, it transmits the control signal for controlling the lighting device 100 to the lighting device 100.

The analysis unit 220 is able to produce the vehicle environment information by analyzing the data, which are received by the communication unit 210 and are related to the inner and outer atmospheres of the vehicle. According to an embodiment, the vehicle environment information includes instrument panel information, information related to the vehicle posture, vehicle velocity, weather, amount of fine dust, vehicle location, navigation information, speeding information, traffic safety information and audio information.

Above all, the analysis unit 220 is able to produce the vehicle environment information in connection with the posture, the speed, and the location of the vehicle based on the data received from a user terminal 300, the accelerator sensor, the gyro sensor, the speed sensor and the GPS module of the vehicle. Here, the vehicle environment information related to the vehicle posture shows a state of the vehicle body based on the data received from the accelerator sensor and gyro sensor. For example, it comprises the information related to turning direction of the vehicle or the information as to whether the vehicle moves on an uphill road or a downhill road. Also, the vehicle environment information related to the vehicle speed may comprise information about a current vehicle speed or information as to whether the vehicle moves at a lower speed, a normal speed or an overspeed on the basis of data from the speed sensor. The vehicle information related to the vehicle location may comprise information about current location of the vehicle based on data from the GPS module and information as to whether the vehicle moves on a specific traffic zone (accident black spot, zone of overspeed enforcement)

The analysis unit 220 produces vehicle environment information according to current audio information of the vehicle. The audio information is referred to as the information related to sound generating through any audio appliance installed in the vehicle, which may comprise the information about radio sound or music currently playing in the vehicle. According to an embodiment, the control device 200 receives the audio information from the user terminal or the audio appliance of the vehicle by way of the wired connection, such as an AUX port, a cigar jack or USB port or the short range wireless communication, such as Bluetooth, Wifi, Zigbee. Otherwise, a sound sensor is included for sensing any sound played in the vehicle, so that it is possible to produce the vehicle environment information according to the sound information.

As such, the vehicle environment information produced by the analysis unit 220 is used as the information enabling the lighting device 100 to be controlled to emit light in different illumination patterns according to each situation, wherein any specific illumination pattern may be customized by way of the application executed by the user terminal 300.

As an example of the analysis of the vehicle environment information using the analysis unit 220, the vehicle posture, the vehicle speed and the sound in the vehicle are described herein above. However, they are only for exemplary illustration and do not limit the scope of the claimed invention. Of course, any information obtainable by way of the communication with the user terminal 300 or the sensor in the vehicle or obtainable from the sensor installed in the control device 200, such as the above-described instrument panel information of the vehicle, the weather, the amount of fine dust, the navigation information, the speeding information, the traffic safety information or any combination thereof may be used for the vehicle environment analysis according to diverse situations.

The memory unit 230 may store an illumination pattern customized by the user terminal 300 to be described later. Here, the illumination pattern may comprise information related to an On/Off control or color and brightness control of LEDs configuring the lighting device 100. The illumination pattern of the lighting device 100 may be arbitrarily customized according to the user's choice using the application executed in the user terminal 300, which will be described later.

According to an embodiment, the illumination pattern stored in the memory unit 230 may be the information that is customized to match with vehicle environment information. That is, the user can may use the application to set in advance what pattern of light the lighting device 100 will emit under what circumstances; the illumination pattern information set as described above is stored in the memory unit 230 of the control device 200; and the control unit 240 may generate a control signal for controlling the lighting device 100 based thereon. A specific example of the illumination pattern customized by the user terminal 300 will be described in detail when describing the application herein below.

The control unit 240 may generate a control signal for controlling the lighting device 100 according to the illumination pattern stored in the memory unit 230 based on the analysis result of the analysis unit 220. The control signal generated by the control unit 240 is transmitted to the lighting device 100 through the communication unit 210, and the lighting device 100 may operate according to the illumination pattern included in the received control signal.

Meanwhile, the control device 200 according to an embodiment may further include a sensor unit (not shown) for analyzing vehicle environment information by itself. That is, the control device 200 according to an embodiment of the present invention may collect data using its own sensor and may perform the analysis of the vehicle environment based thereon, in addition to the reception of data from the user terminal 300 or a sensor in the vehicle.

Although the configurations of the lighting device 100 and the control device 200 according to an embodiment of the present invention have been separately described above, it is not necessary to configure these devices as physically distinguished entities. In some cases, the lighting device 100 and the control device 200 may be integrated to perform the above-described functions as a single entity.

Referring back to FIG. 1, the user terminal 300 and the application executed by the user terminal 300 will be described below.

The user terminal 300 executes a customizing-application to thereby customize the illumination pattern of the lighting device 100 according to diverse vehicle environment information. Also, the user terminal 300 serves as a kind of remote control, and thus, it may perform a function of direct control of the control device 200. In the present invention, the user terminal 300 is construed as comprising a processor capable of executing a specific program (application) and any terminal device equipped with data input function. For example, it may be a portable terminal, such as a mobile phone, a smart phone, a tablet, and a laptop computer, or a navigation device or a car-play installed in the vehicle.

Figure 5:
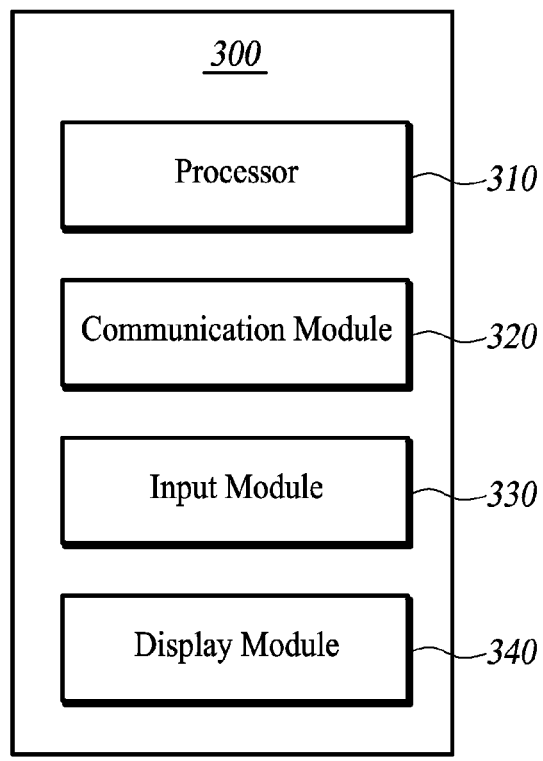
FIG. 5 shows a configuration of a user terminal according to an embodiment of the present invention.
Figure 6A:
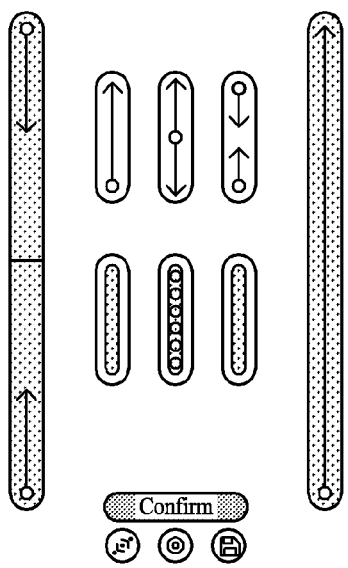
FIGS. 6A to 6F show an example of an interface provided by an application according to an embodiment of the present invention.
Figure 6A:
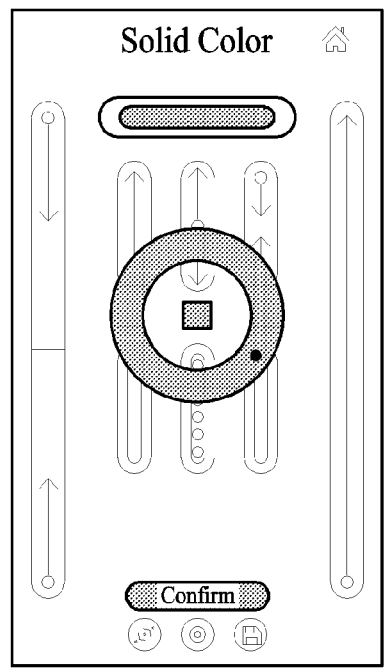
Figure 6A:
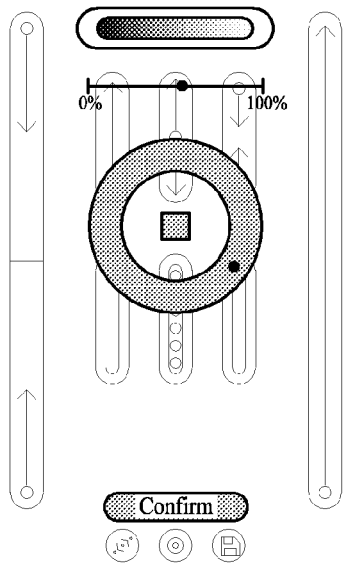
Figure 6A:
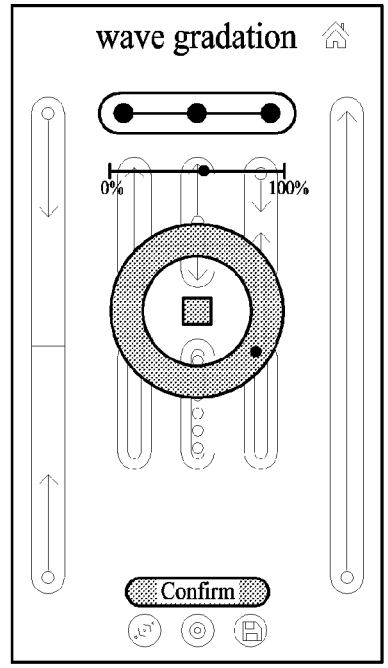
Figure 6B:
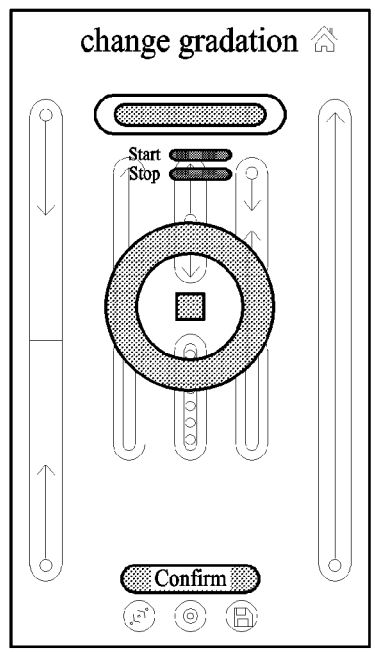
Figure 6B:
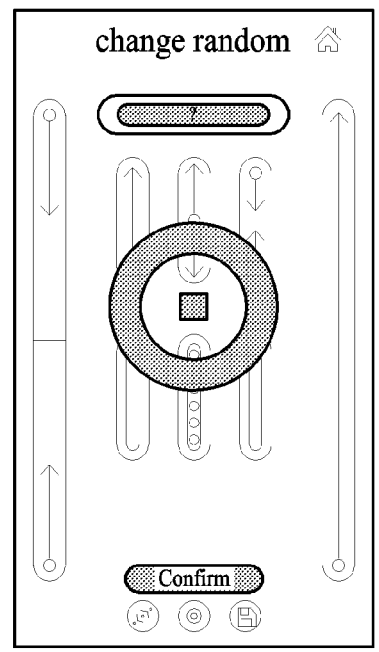
Figure 6B:
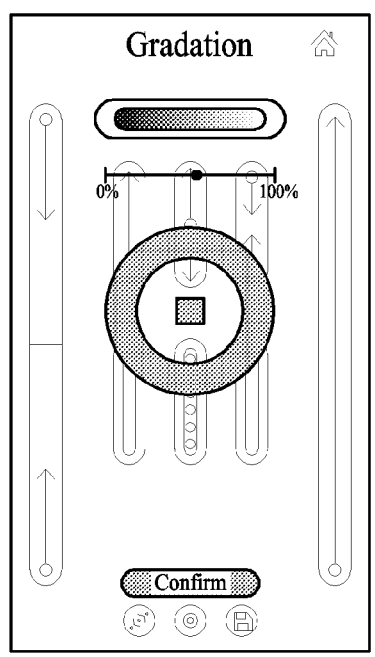
Figure 6B:
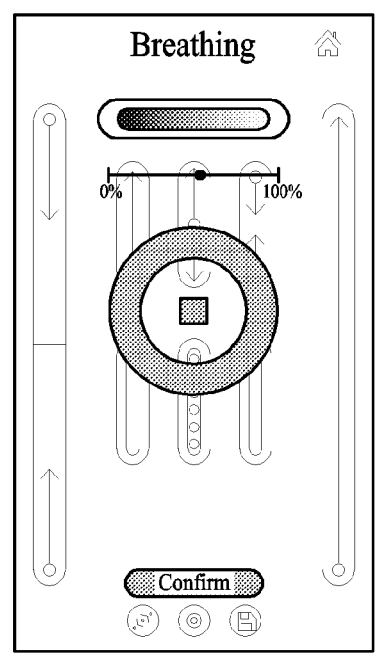
Figure 6C:
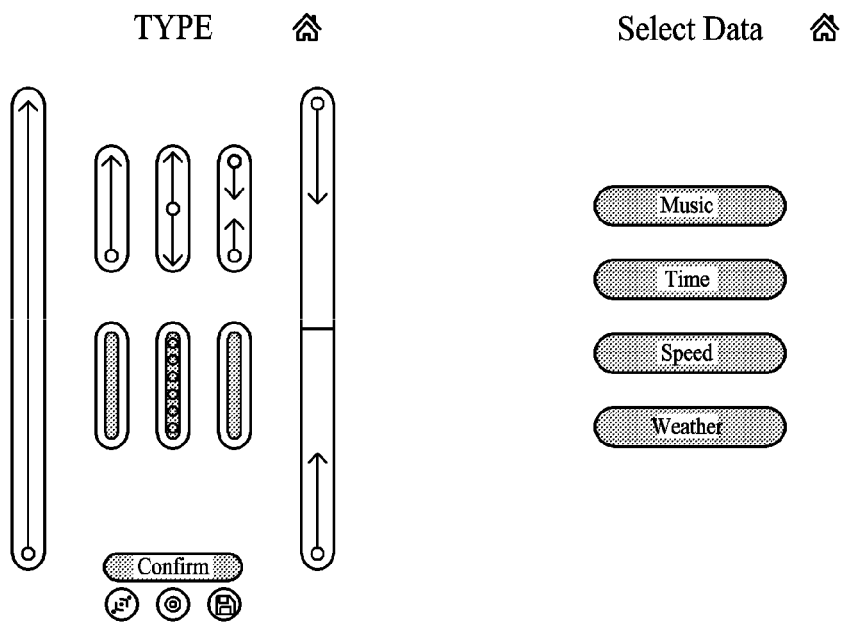
Figure 6C:
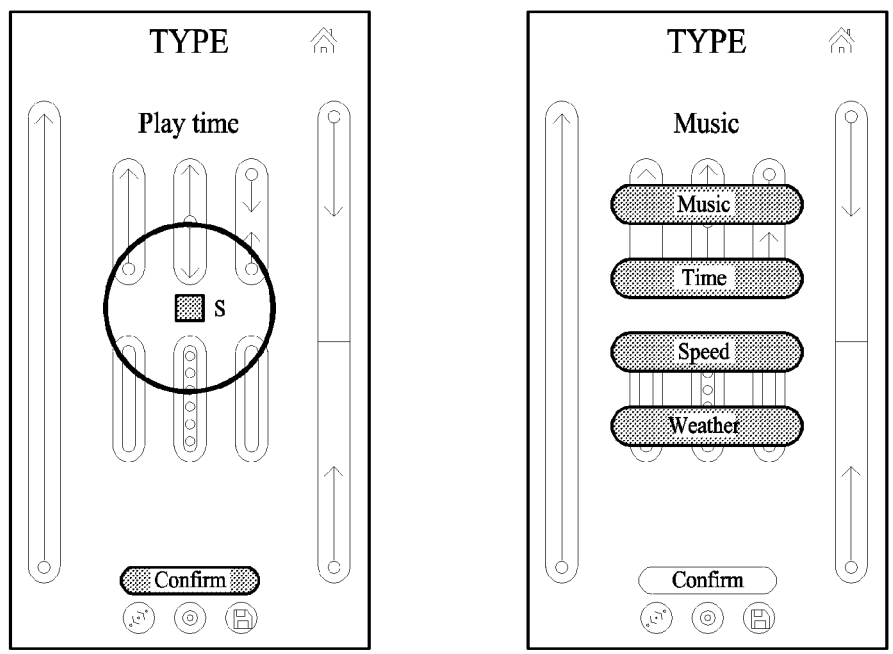
Figure 6D:
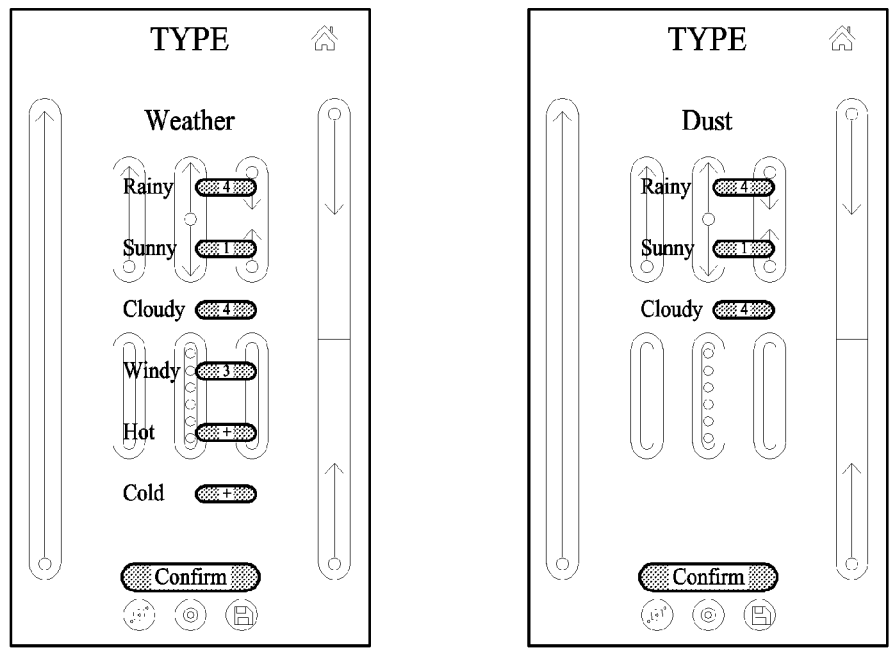
Figure 6D:
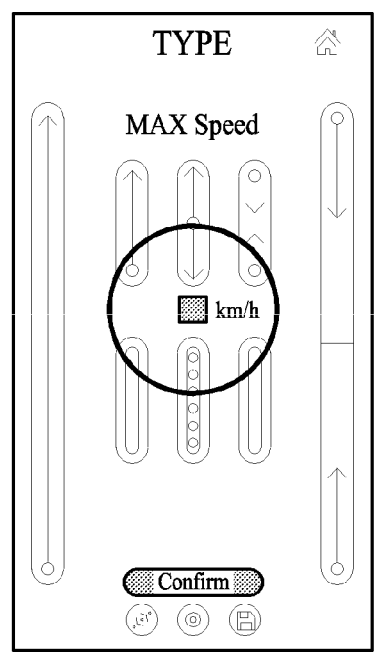
Figure 6E:
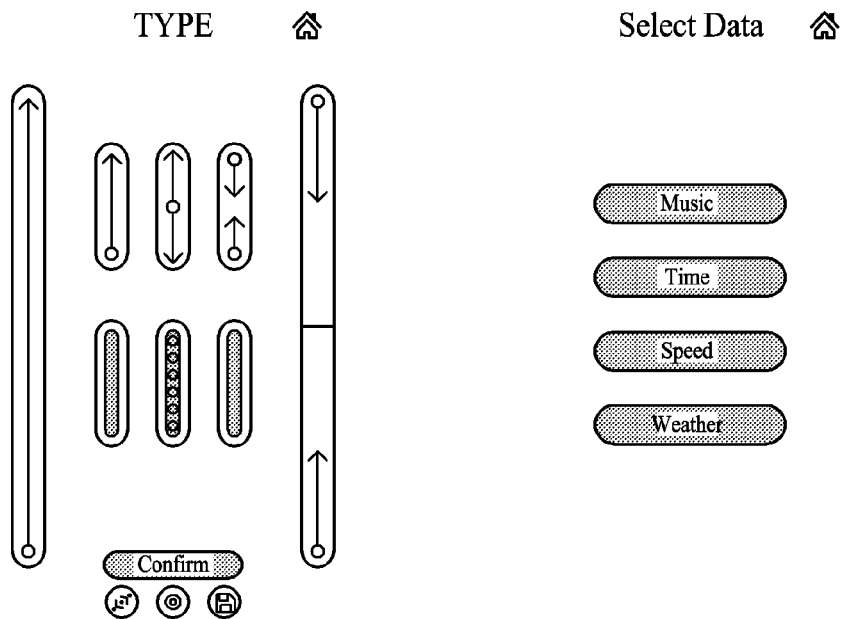
Figure 6E:
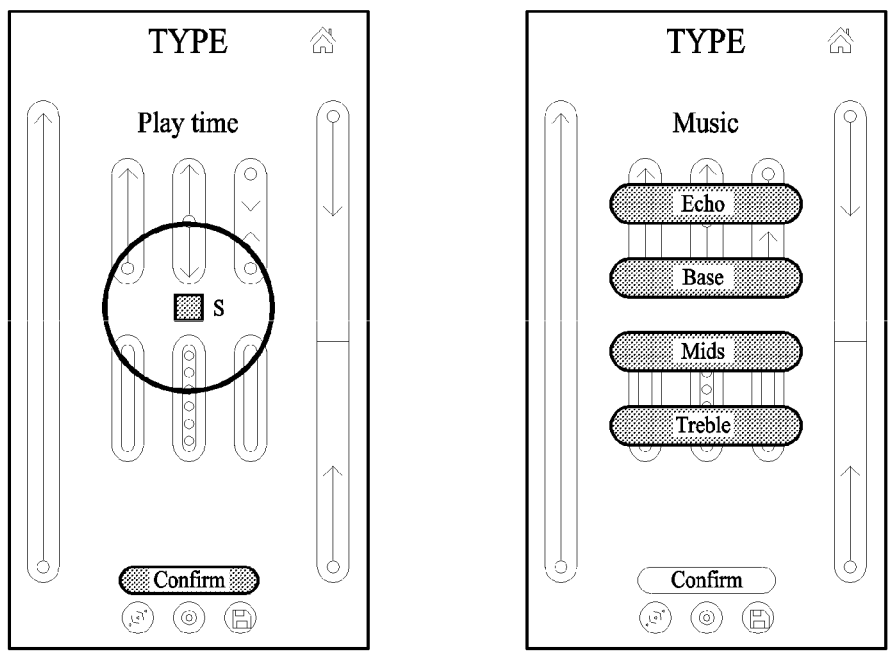
Figure 6F:
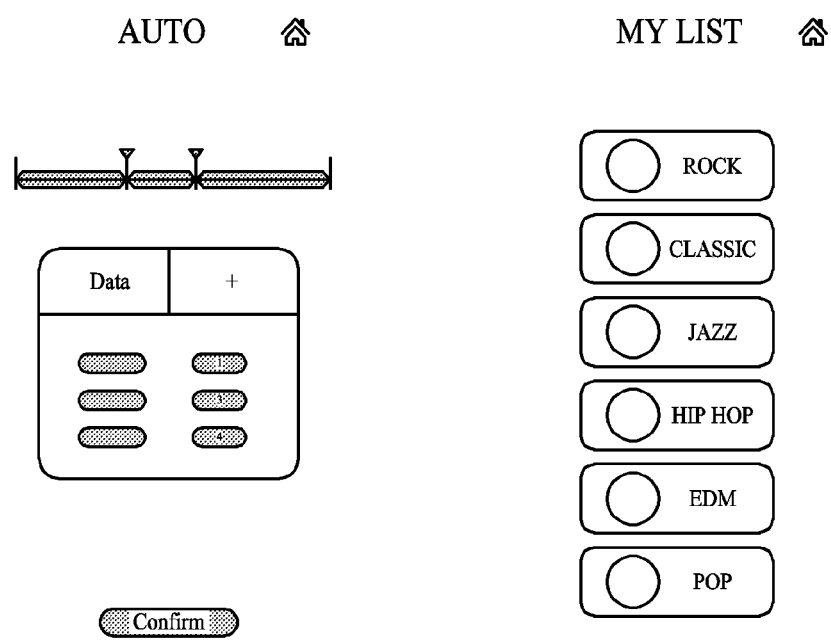

FIG. 5 shows the configuration of the user terminal 300 according to an embodiment of the present invention.

Referring to FIG. 5, the user terminal 300 according to an embodiment of the present invention may include a processor 310, a communication module 320, an input module 330, and a display module 340.

The processor 310 may execute the application for customizing the illumination pattern. Here, the application is construed as comprising any application software, which is executed by a series of electronic devices and which is developed for performing a specific function. The meaning of the application does not have to be limited to a mobile application executed by a smart phone or a tablet.

Herein-below, an interface provided by an application executed by the processor 310 of the user terminal 300 will be described.

FIGS. 6A to 6F are diagrams illustrating an example of an interface provided by an application according to an embodiment of the present invention.

According to an embodiment, the application may provide a setting interface for setting a control pattern of the lighting device 100. The control pattern of the lighting device 100 may be set to comprise On/Off status, color or brightness of each of the plurality of the LEDs in the lighting device 100. The user may set the desired illumination pattern using the input module 330 as described below, so that the lighting device 100 may be controlled in accordance with the illumination pattern as desired by the user. As described above, when the smart lighting system 10 for the vehicle according to the present invention comprises a plurality of lighting devices 100, the illumination pattern may be set for each lighting device 100.

In addition, the control pattern of the lighting device 100 according to an embodiment may be set a different way in response to each vehicle environment information. In other words, the user may set the illumination pattern corresponding to each of the plurality of vehicle environment information that have already been set through the setting interface. In this way, the lighting device 100 may be automatically controlled with the illumination pattern that is differently set according to the vehicle environment in the course of driving.

According to an embodiment, the application may provide a sharing interface for sharing the illumination pattern information, which is customized by the user, through the server. The user may upload and register his/her own illumination pattern information on the server that can be accessed by the user terminal 300 thorough wired or wireless communication network. At the same time, the other illumination pattern uploaded by the other user may be downloaded, so that the user can make use of the same so as to customize the illumination pattern of the lighting device 100 included in his vehicle.

According to an embodiment, the application may further include a control interface for controlling the operation of the control device 200. In this case, the user terminal 300 may function as a kind of remote control for controlling the control device 200, and the user may control operation mode of the control device 200 through the control interface.

Returning to the description of FIG. 5, the user terminal 300 will be described.

The communication module 320 may communicate with the control device 200 to transmit/receive data. According to an embodiment, the communication module 320 may communicate with the control device 200 using a short-range wireless communication technology. The short-range wireless communication may comprise Bluetooth or wireless LAN (WLAN), Ultra Wideband (UWB), Infrared Data Association (IrDA), Zigbee, Radio Frequency Identification (RFID), and the like.

The input module 330 may allow a signal for selecting or inputting specific information to be inputted on an application, which receives the user's interaction and which is executed by the processor 310.

The input module 330 may be, for example, an input device such as a keyboard, a mouse, a joystick, or a touch panel; and the user's interaction that the input module 330 receives may comprise, for example, a click, tap, double tap, drag and drop, swipe, pinch in/out, flick, force-touch and the like. However, it is not necessarily limited thereto, and diverse types of interactions may be received depending on types of the input module 330.

The display module 340 may display the application executed by the processor 310. The display module 340 may comprises, for example, a liquid crystal display (LCD), a thin film transistor-liquid crystal display (TFT LCD), an organic light-emitting diode (OLED), a flexible display or the like.

The specific configuration of the smart lighting system 10 for the vehicle according to an embodiment of the present invention has been described above. Here-below, a method of controlling a smart lighting system for a vehicle using the above-described smart lighting system 10 will be described with reference to FIGS. 7 and 8.

Figure 7:
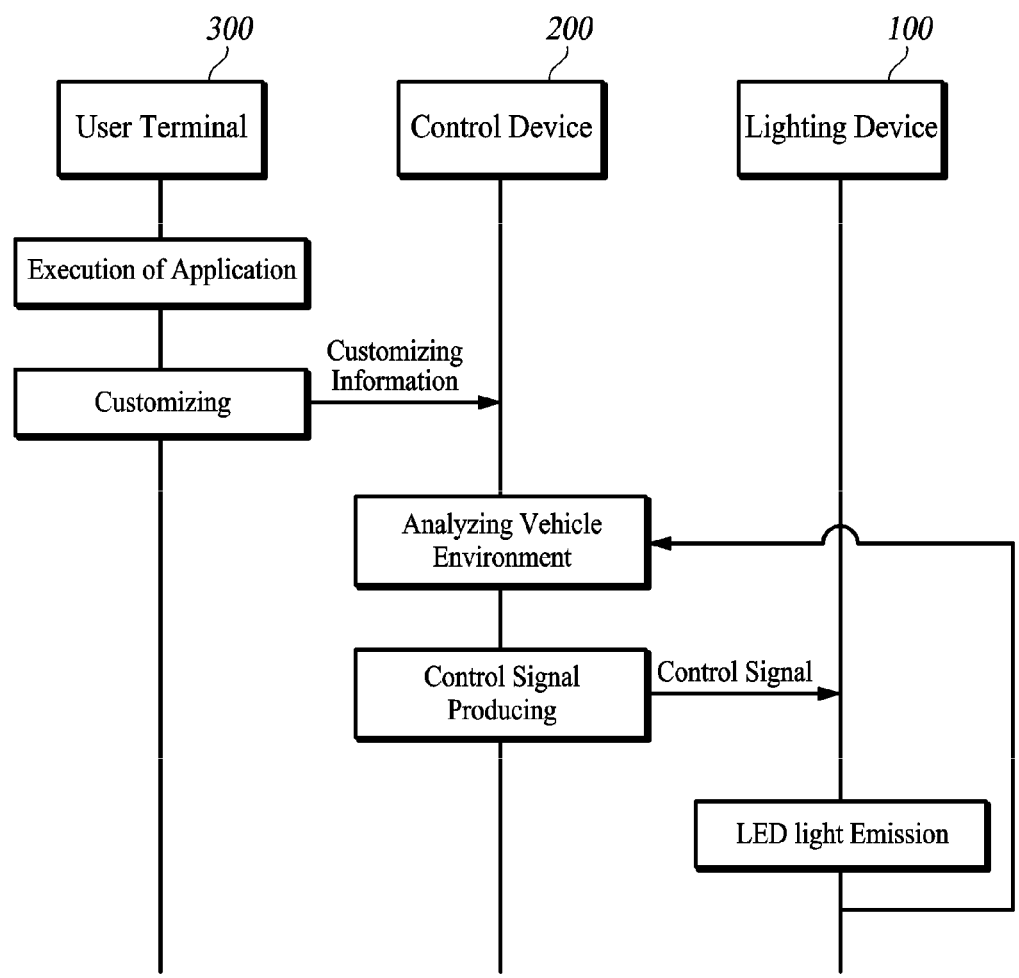
FIG. 7 shows a method of controlling a smart lighting for a vehicle according to an embodiment of the present invention.

FIG. 7 is a view showing a method of controlling a smart lighting system for a vehicle according to an embodiment of the present invention.

Referring to FIG. 7, the method for controlling the smart lighting system for the vehicle according to an embodiment of the present invention comprises steps of: customizing the illumination pattern of the lighting device 100 through an application executed by the user terminal 300; causing the control device 200 to output the control signal for controlling the lighting device according to said illumination pattern; and causing the lighting device 100 to emit light according to the control signal.

First, the user executes the application through the user terminal 300, and sets the illumination pattern of the lighting device 100 using an interface provided by the application. In this case, the illumination pattern of the lighting device 100 may comprise the information about On/Off control or color and brightness control of the LED included in the lighting device 100. In other words, the user performs the customization through the application, so that the lighting device 100 emits light according to a pattern desired by the user. According to an embodiment, the illumination pattern may be matched with diverse vehicle environment information for customization. Vehicle environment information means the information generated according to the travel condition of the vehicle or the inner and outer atmospheres of the vehicle. For example, it comprises vehicle instrument panel information, vehicle posture, vehicle speed, weather, amount of fine dust, vehicle location, navigation information, overspeed information, traffic safety information, audio information, and the like. In this way, the illumination pattern customized by the application is transmitted to the control device 200 and stored in the memory unit 230.

The control device 200 may produce the vehicle environment information using data collected from the user terminal 300 or the sensor installed in the vehicle, and may produce and output control signals for controlling the lighting device according to the illumination pattern stored in the memory unit 230.

Figure 8:
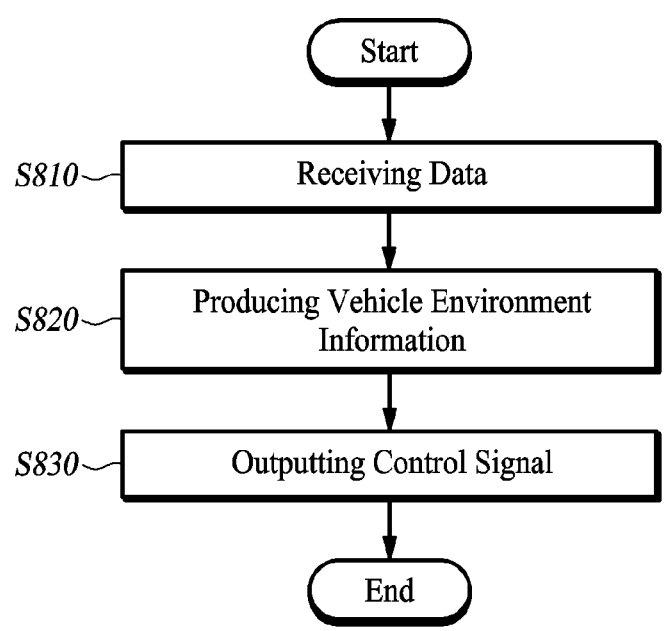
FIG. 8 shows a step of outputting a control signal from a control device according to an embodiment of the present invention.

FIG. 8 is a diagram specifically illustrating a step of outputting the control signal from the control device 200 according to an embodiment of the present invention.

Referring to FIG. 8, the control device 200 collects data for producing the vehicle environment information about the inner and outer atmospheres of the vehicle from the user terminal 300 or the sensor provided in the vehicle through the communication unit 210 (S810). The analysis unit 220 may generate the vehicle environment information based on the collected data (S820). As such, when the vehicle environment information is generated by the analysis unit 220, the control unit 240 may produce and output the control signal based on the illumination pattern customized by the generated vehicle environment information and the above-described user's terminal 300. Accordingly, the control signal is transmitted to the signal receiver unit provided in the lighting device 100 (S830).

Referring back to the description of FIG. 7, when the lighting device 100 receives the control signal from the control device 200, the LEDs included in the lighting device 100 are controlled according to the illumination pattern information in the control signals, so that the light is emitted to thereby enable the illumination of the vehicle. Meanwhile, even while the lighting device 100 emits light according to the control signal as described above, the control device 200 may receive data in a continuous manner to thereby analyze the vehicle environment, and thus, it may output control signals in real time in response to changes in vehicle environment. The lighting device 100 may receive the control signal in real time and may emit light according to the illumination pattern information included in the control signals.

Each step of the method for controlling the smart lighting system for the vehicle described above may be performed by each component of the smart lighting system 10 for the vehicle. Although not specifically with regard to the method for controlling the smart lighting system in order to avoid repetitive description, it is possible to provide a method for controlling the smart lighting system, according to diverse embodiments utilizing the functions performed by each component of the smart lighting system 10.

The smart lighting system 10 for the vehicle and the method of controlling the same according to an embodiment of the present invention have been described herein-above. The present invention makes it possible to provide the user with the driving-related information in an intuitive manner by means of the lighting device and its control system, wherein the lighting device and the control system operate in diverse patterns in response to the inner and outer atmospheres of the vehicle. Also, the user may customize the illumination pattern of the lighting device at his/her discretion, so that it is possible to provide the smart lighting system for the vehicle enabling the creation of diverse environments in the vehicle.

The embodiments of the present invention described above are described for the purpose of illustration, and the present invention is not limited thereto. In addition, one of ordinary skill in the technical field of the present invention will be able to make various modifications and changes within the spirit and scope of the present invention, and such modifications and changes should be construed as falling under the scope of the present invention.

The invention claimed is:
1. A smart lighting system for a vehicle consisting of:
a lighting device installed in the vehicle and emitting light for interior illumination;

a control device for outputting a control signal so as to control said lighting device based on vehicle environment information according to inner and outer atmospheres of the vehicle, the control device comprising:
  a communication unit for communicating with a sensor included in the vehicle and for receiving data about inner and outer atmospheres of the vehicle;
  an analysis unit for analyzing the received data and for producing the vehicle environment information;
  a memory unit for storing illumination pattern; and
  a control unit for producing a control signal so as to control the lighting device according to an analysis result of the analysis unit; and
a user terminal for executing an application to customize the illumination pattern and to control the control device or the lighting device, the user terminal comprising:
  a processor for executing the application customizing the illumination pattern;
  a communication module in communication with the control device to transmit and receive data;
  an input module for receiving user interaction; and
  a display module for displaying said executed application
wherein said lighting device comprises:
  a signal receiver for receiving the control signal from said control device; and
  one or more LEDs for emitting light according to said control signal,
wherein the illumination pattern comprises information with respect to On/Off status, color or brightness of said one or more LEDs, the illumination pattern set to match with said vehicle environment information,
wherein said vehicle environment information comprises at least one or more of instrument panel information of the vehicle, vehicle posture, vehicle speed, weather, amount of fine mist, vehicle location, navigation information, speeding information, traffic safety information and audio information.

2. The smart lighting system for the vehicle as claimed in claim 1, wherein said one or more LEDs are capable of individual color control.

3. The smart lighting system for the vehicle as claimed in claim 1, wherein said one or more LEDs are capable of stepwise-brightness control.

4. A method of controlling a smart lighting system for a vehicle, consisting of:
  customizing illumination pattern of a lighting device by executing an application with a user terminal;
  outputting, by a control device, a control signal for controlling the lighting device based on vehicle environment information according to inner and outer atmospheres of the vehicle; and
  emitting, by the lighting device, light according to said control signal;
  wherein said control signal comprises illumination pattern information of said lighting device according to said vehicle environment information,
  wherein the step of customizing the illumination pattern comprises the customization performed to match the illumination pattern with the vehicle environment information,
  wherein the vehicle environment information comprises at least one or more of instrument panel information of the vehicle, vehicle posture, vehicle speed, weather, amount of fine mist, vehicle location, navigation information, speeding information, traffic safety information and audio information,
  wherein said step of outputting the control signal comprises steps of:
    communicating with a sensor included in the vehicle and receiving data related to the inner and outer atmospheres of the vehicle;
    analyzing said received data and producing the vehicle environment information; and
    generating and outputting the control signal for controlling the lighting device according to analysis result.

* * * * *